(12) United States Patent
Rupprecht et al.

(10) Patent No.: US 11,292,218 B2
(45) Date of Patent: Apr. 5, 2022

(54) METHOD FOR PRODUCING A TREAD (71) Applicant: KRAUSSMAFFEI BERSTORFF GMBH, Hannover (DE)

(72) Inventors: Marko Rupprecht, Algermissen (DE); Jörg Reinefahl, Isernhagen (DE)

(73) Assignee: KRAUSSMAFFEI BERSTORFF GMBH, Hannover (DE)

( * ) Notice: Subject to any disclaimer, the term of this patent is extended or adjusted under 35 U.S.C. 154(b) by 326 days.

(21) Appl. No.: 16/346,759

(22) PCT Filed: Nov. 8, 2017

(86) PCT No.: PCT/EP2017/078639
§ 371 (c)(1),
(2) Date: May 1, 2019

(87) PCT Pub. No.: WO2018/099704
PCT Pub. Date: Jun. 7, 2018

(65) Prior Publication Data
US 2019/0275723 A1 Sep. 12, 2019

(30) Foreign Application Priority Data

Dec. 2, 2016 (DE) .......................... 102016123339.0
Apr. 26, 2017 (DE) .......................... 102017108943.8

(51) Int. Cl.
*B29D 30/52* (2006.01)
*B60C 19/08* (2006.01)
(Continued)

(52) U.S. Cl.
CPC .............. *B29D 30/52* (2013.01); *B29C 48/21* (2019.02); *B29C 48/49* (2019.02); *B29C 48/92* (2019.02);
(Continued)

(58) Field of Classification Search
CPC ................ B29D 2030/526; B29C 2948/92238
See application file for complete search history.

(56) References Cited

U.S. PATENT DOCUMENTS 3,710,241 A * 1/1973 Dineen .................. B29C 48/92
324/558
3,864,625 A * 2/1975 Zumbach ............... B29C 48/92
324/231
(Continued)

FOREIGN PATENT DOCUMENTS

EP 1083425 A2 3/2001
JP 11151907 6/1999

OTHER PUBLICATIONS

International Search Report for PCT/EP2017/078639 dated Feb. 23, 2018.
Written Opinion for PCT/EP2017/078639 dated Feb. 23, 2018.

*Primary Examiner* — Benjamin A Schiffman
(74) *Attorney, Agent, or Firm* — Pearne & Gordon LLP (57) ABSTRACT

The invention relates to a method for producing a tread (20), comprising the steps: extruding the tread (20), which has an outer side (22) and an inner side (24), opposite the outer side (22), and a carrying region (26) made of a carrying region rubber material and a guide strip (28) made of a guide strip rubber material, wherein the guide strip (28) extends from the outside (22) to the inside (24) and a specific electrical guide strip resistance ($W_{28}$) of the guide strip rubber material is smaller than a specific electrical carrying region resistance of the carrying region rubber material. The steps according to the invention are: determining an electrical guide strip resistance ($W_{28}$) of the guide strip (28) between the outer side (22) and the inner side (24) and outputting a warning signal when the electrical resistance (W) exceeds a specified maximum resistance ($W_{28,max}$).

5 Claims, 4 Drawing Sheets

(51) Int. Cl.
*B29C 48/92* (2019.01)
*G01N 27/04* (2006.01)
*B29C 48/49* (2019.01)
*B29C 48/21* (2019.01)
*B29K 105/00* (2006.01)

(52) U.S. Cl.
CPC ............ *B60C 19/08* (2013.01); *B60C 19/082* (2013.01); *G01N 27/041* (2013.01); *B29C 2948/92238* (2019.02); *B29C 2948/92733* (2019.02); *B29D 2030/526* (2013.01); *B29K 2105/0023* (2013.01); *B29K 2995/0003* (2013.01)

(56) References Cited

U.S. PATENT DOCUMENTS

| | | | | |
|---|---|---|---|---|
| 4,086,044 A * | 4/1978 | Sikora | ................ | G01B 11/26 425/113 |
| 4,088,952 A * | 5/1978 | Sikora | ................ | B29C 35/065 324/207.17 |
| 4,260,566 A * | 4/1981 | Brouwer | ................ | B29C 48/92 264/408 |
| 4,592,881 A * | 6/1986 | Kyriakis | ............... | B29C 44/322 264/40.1 |
| 6,202,724 B1 * | 3/2001 | Hiruma | ................ | B60C 11/18 152/152.1 |
| 6,536,597 B1 | 3/2003 | Farne et al. | | |
| 8,167,014 B2 * | 5/2012 | Fukase | ................ | B60C 19/08 152/152.1 |
| 8,167,015 B2 * | 5/2012 | Mizutani | ............... | B60C 19/08 152/152.1 |
| 8,356,646 B2 * | 1/2013 | Pringiers | ............... | B60C 7/00 152/152.1 |
| 9,028,630 B2 * | 5/2015 | Asayama | ............... | B29D 30/60 156/117 |
| 9,138,953 B2 * | 9/2015 | Kuroki | ................ | B29D 30/60 |
| 9,586,447 B2 * | 3/2017 | Van Der Meulen | .... | B60C 19/08 |
| 9,821,524 B2 * | 11/2017 | Denavit | ............... | B29C 43/24 |
| 9,862,158 B2 * | 1/2018 | Murase | ............... | B29D 30/1607 |
| 11,046,126 B2 * | 6/2021 | Mitsuoka | ............. | B60C 19/082 |
| 11,110,756 B2 * | 9/2021 | Mukai | ................ | B29D 30/0606 |
| 2002/0088527 A1 * | 7/2002 | Tanaka | ................ | B29D 30/54 156/95 |
| 2006/0042733 A1 * | 3/2006 | Matsui | ................ | B29D 30/60 152/152.1 |
| 2006/0096697 A1 * | 5/2006 | Miki | ................... | B29D 30/30 156/130 |
| 2007/0125466 A1 * | 6/2007 | Nagahara | ............ | B60C 19/08 152/152.1 |
| 2008/0283165 A1 * | 11/2008 | Mafune | ............... | B29D 30/60 152/152.1 |
| 2014/0283964 A1 | 9/2014 | Van Der Meulen et al. | | |
| 2015/0241491 A1 | 8/2015 | Ueda et al. | | |
| 2019/0275723 A1 * | 9/2019 | Rupprecht | ............ | B29C 48/49 |
| 2020/0368983 A1 * | 11/2020 | Amurri | ................ | B29D 30/60 |
| 2021/0162632 A1 * | 6/2021 | Onodera | ............... | B29B 7/726 |

* cited by examiner

METHOD FOR PRODUCING A TREAD

CROSS-REFERENCE TO RELATED APPLICATIONS

This is a National Stage application of PCT international application PCT/EP2017/078639, filed on Nov. 8, 2017, which claims the priority of German Patent Application No. 10 2016 123 339.0, filed Dec. 2, 2016, and German Patent Application No. 10 2017 108 943.8, filed Apr. 26, 2017, which are incorporated herein by reference in their entireties.

FIELD OF THE INVENTION

The invention relates to a method for manufacturing a tread, with the steps of (a) extruding a tread that has an exterior side and an interior side lying opposite the exterior side, and comprises a supporting area made out of a rubber supporting area material and a guide strip made out of a rubber guide strip material, wherein (b) the guide strip extends from the exterior side to the interior side, and a specific electrical guide strip resistance of the guide strip rubber material is less than a specific electrical supporting area resistance of the supporting area rubber material. In a second aspect, the invention relates to a tread manufacturing device for manufacturing a tread with an extruder system, which has an exterior side and an interior side lying opposite the exterior side, and comprises a supporting area made out of a rubber supporting area material and a guide strip made out of a rubber guide strip material, wherein the guide strip extends from the exterior side to the interior side.

BACKGROUND OF THE INVENTION

Such treads are used during the manufacture of vehicle tires, in particular passenger car tires and truck tires. In order to reduce roll resistance, the rubber supporting area material is often made out of rubber and silicon dioxide (English: silica), wherein there is little or no soot present. Therefore, the rubber supporting area material has a very high specific electrical resistance, and is often an insulator. The tread is provided to prevent the tires from becoming electrostatically charged while rolling. The latter is arranged in such a way that, with the vehicle in question standing on the road, it produces an electrical contact between the road surface and a component of the tire, which is connected with the chassis of the vehicle over an electrical path that is so small that electrostatic charges are avoided.

However, it turns out that even tires that have such a tread can tend to become electrostatically charged.

BRIEF SUMMARY OF THE INVENTION

The object of the invention is to diminish the electrostatic charge on vehicles with tires.

The invention resolves this problem with a generic method that comprises the steps of (c) determining a parameter that correlates with an electrical guide strip resistance of the guide strip between the exterior side and interior side, and (d) outputting a warning signal when the parameter assumes a value indicating that the guide strip resistance $W_{28}$ exceeds a prescribed maximum value. In particular, the warning signal is output if the parameter exceeds the prescribed maximum value.

In particular, the electrical parameter is an electrical current that flows with a prescribed electrical charge while charging the tread, and the maximum value is exceeded when the electrical current drops below a prescribed minimum value. Alternatively, the parameter is an electrical voltage that arises when a prescribed electrical current is applied, and the maximum value is a maximum voltage. As another alternative, the parameter is the electrical guide strip resistance itself, and the maximum value is a maximum electrical resistance.

In a second aspect, the invention resolves the problem with a generic tread manufacturing device that has a resistance determining device, which exhibits an outer electrode set up to contact the exterior side of the tread and an inner electrode set up to contact the interior side of the tread. The resistance determining device is preferably designed to automatically measure a parameter that correlates with a guide strip resistance of the guide strip between the exterior side and interior side.

The invention advantageously ensures a sufficiently high electrical conductivity for the guide strip. This is because it was surprisingly discovered that the guide strip can have a geometric structure due to fluctuations in the production process, which results in too high an electrical resistance. If such a case were to arise, it can now be quickly identified. The corresponding section of the tread can be eliminated.

It is also advantageous that the measurement can be performed with a low technical outlay. The tread always exits the extruder system in the same alignment, so that the guide strip always lies at the same location. As a result, it is easy to electrically contact the latter.

Within the framework of the present specification, the parameter is to be understood in particular as any value or any variable based upon which the electrical resistance can be inferred. For example, the parameter is an electrical current, an electrical voltage or a digital signal, which codes the corresponding variable or corresponding value.

The guide strip resistance is to be understood in particular as the resistance determined at the measuring location. The guide strip is a—at least theoretically—quasi infinitely extended region. However, a measurement is always performed on a finite segment of the guide strip. As a result, the guide strip resistance is in particular the resistance of that region of the guide strip where the measurement is performed. The guide strip resistance can therefore be regarded as a length-specific resistance.

The feature in which the parameter correlates with the guide strip resistance is understood in particular to mean that a determination can be made whether the guide strip is functional or not based on the parameter.

According to a preferred embodiment, determining the electrical resistance involves the steps of contacting the exterior side by means of an outer electrode and contacting the interior side of the tread with an inner electrode, wherein one of the electrodes contacts the tread from above. After exiting the extruder system, the tread often lies flat on a conveying device. In this state, it is especially easy to electrically contact the guide strip.

Contacting is understood in particular to mean that electrical charges are applied to the guide strip and again removed. In a preferred embodiment, it is possible for contacting to take place without contact. This is understood to mean that a distance different than zero exists between the electrode that emits the electrical charges and the guide strip. In particular, this distance is greater than 0.5 millimeters, in particular greater than 1 millimeter.

Determining the electrical resistance preferably involves applying an electrical voltage, in particular a d.c. voltage, an a.c. voltage, for example with a frequency of between 1

Hertz and 100 Kilohertz, or a voltage with a d.c. voltage and a.c. voltage, to the electrodes and measuring the resultant electrical current.

The voltage is preferably a d.c. voltage of at least 1000 volts, in particular of at least 3000 volts. In this case, it makes sense for a distance between the electrode and tread to measure at least 2 mm, in particular at least 5 mm. This diminishes the risk of the electrode contacting the tread. The distance preferably measures at most 10 cm, in particular at most 8 cm. The advantage to the high voltage is that the function of the guide strip can be checked especially well, and readily corresponds to the voltage situation of a tire.

If the tread is grounded as provided in a preferred embodiment and/or lies on a grounded conveying device, a side of the tread, in particular the one facing the electrode, is electrostatically charged. Charging can take place with a positive or negative charge. In addition, the exterior side or interior side can be electrostatically charged.

Electrostatic charging produces an electrical current I, which can also be referred to as a charging current, and is especially large if the guide strip is correctly formed. If the tread is not functional, the electrical charge is not removed. As a result, the charge on the surface of the tread increases rapidly, so that an electrical field forms, counteracting the passage of additional charge carriers to the surface of the tread. As a result, the current emitted by the electrode drops.

If, as provided in a preferred embodiment, the voltage between the electrode (inner electrode or outer electrode) and tread is regulated, in particular by means of an evaluation circuit, a drop in the electrical current shows that the guide strip has not been correctly formed. For this reason, the electrical current can be used as a parameter that indicates whether the guide strip is correctly formed. The voltage is preferably regulated to a constant desired voltage value. However, it is also possible for the voltage to be regulated to a time-variable desired voltage value.

If, as provided in an alternative preferred embodiment, the current between the electrode (inner electrode or outer electrode) and tread is regulated, in particular by means of an evaluation circuit, in particular to a constant desired current value, a rise in the electrical voltage U shows that the tread is not correctly formed, since the charges cannot be dissipated through the tread. For this reason, the electrical voltage U can be used as a parameter that indicates whether the guide strip is correctly formed. It is also possible that the current be regulated to a time-variable desired current value.

Alternatively, the voltage measures at least 1 volt and at most 1000 volts. An a.c. voltage can also be involved.

The electrode used to apply the charge preferably has an emission edge. The emission edge is understood in particular as a region of the electrode that has so small a radius of curvature that electrodes [sic] are emitted or received when an electrical voltage is applied to the electrode relative to the tread. The emission edge is preferably at least 3 mm wide. The width of the emission edge relates to its direction of extension. The advantage to the emission edge is that the charges cannot be emitted by a point-shaped, but rather by an oblong source. As provided according to a preferred embodiment, this makes it possible to align the electrode in such a way as to extend transverse to the guide strip. In other words, an angle between the emission edge and guide strip measures at most $\alpha=50°$, preferably at most 25°.

It is especially favorable that the electrode be designed so it can be turned in such a way that an effective width of the electrode can be varied. The effective width of the electrode is the projection of the electrode onto a plane, which lies perpendicular on the direction of movement of the tread.

The method preferably involves the step of discharging the tread. For example, this can take place by means of a grounded electrode, which is arranged in a contacting or non-contacting manner in the tread in the direction of material flow behind the electrode for applying the charge.

Alternatively or additionally, determining the electrical resistance preferably involves applying an electrical current, in particular a direct current, an alternating current, for example with a frequency of between 1 Hertz and 100 Kilohertz, or a current with a direct current and alternating current portion, to the electrodes and measuring the resultant electrical voltage. It is especially favorable that the resistance be measured at least quasi-current-free, for example by means of a Wheatstone bridge. It is favorable if the electrical power introduced into the tread by the measurement amount to at most 3 Watts.

It is especially favorable that a distance between an outlet opening of the extruder system and the point at which the electrical guide strip resistance is determined measure at most 10 meters. The advantage to this is that only a slight loss of guide strip is caused by exceeding the maximum resistance and—as provided according to a preferred embodiment—cutting out the portion of the tread in which the maximum resistance has been exceeded. In addition, the quality of tires manufactured with the tread is increased.

After it exits the extruder system, the tread is preferably transported on a conveyor, wherein a portion of the conveyor initially forms one of the electrodes. For example, the conveyor is a roller conveyor, wherein the rollers consist of a conductive material, in particular of metal. Since the tread rests on the conveyor in such a way that the lower end of the guide strip is in contact with the conveyor, so as to contact the guide strip from the side lying opposite the conveyor.

The outer electrode and/or inner electrode preferably has a plurality of flexible, in particular hair-shaped or tongue-shaped, conductors. These conductors are in electrical contact with the guide strip. The plurality of hair-shaped conductors ensures that one of the conductors always contacts the guide strip. The individual conductors are electrically connected with each other, so that it is enough for one of the conductors to contact the guide strip. Electrodes having a plurality of such conductors are also mechanically robust, and thus not susceptible to failure. In other words, the outer electrode and/or inner electrode is preferably a brush electrode. The hair-shaped conductors here comprise the bristles of the brush. When using an outer electrode and/or the inner electrode in the form of a brush electrode, it is possible, but not necessary, that one portion of the conveyor form one of the electrodes.

A slender conductor is here understood in particular as an electrical conductor whose length (i.e., the expansion in a spatial direction, specifically the longitudinal direction) measures at least 5 times a largest expansion transverse to the longitudinal direction. In a hair-shaped conductor, the length measures at least 5 times a diameter. In particular, the conductor is so stiff as to press against the guide strip with a force great enough to build up an electrical contact. It is favorable that the conductors have carbon fibers or carbon fibers and/or consist of carbon fibers. The latter have especially little influence on the surface of the tread. Alternatively or additionally, the conductors can be built up out of metal or comprise the latter.

The electrical resistance for one of the conductors preferably measures at most 10 ohm, in particular at most 1 ohm.

Alternatively or additionally, the outer electrode and/or inner electrode has a wheel, which is in electrical contact with the guide strip. The advantage to this is that the wheel has especially little influence on the surface of the tread.

The electrical resistance is preferably measured without current. For example, the tread manufacturing device has a resistance determining device, which contains a Wheatstone bridge circuit.

The method according to the invention preferably involves the step of isolating a region of the tread where the maximum resistance has been exceeded. For example, this can be accomplished by marking the tread in such a way that the regions where the maximum resistance is exceeded not be used during subsequent further processing. For example, the corresponding regions of the tread are marked with a color or mechanically.

Alternatively or additionally, the region in which the maximum resistance is exceeded can be marked by determining its position from the speed at which the guide strip is moving on the one hand and the time at which the exceeded maximum resistance is detected on the other. If the latter region reaches a trimming device, which in a preferred embodiment is part of a tread manufacturing device according to the invention, this region is cut out and not used for fabricating tires.

The method preferably involves the steps of vulcanizing the guide strip in conjunction with a steel belt, thereby yielding a tire, with the guide strip being in electrical contact with the steel belt. The guide strip along with the other components with which the guide strip is vulcanized are preferably designed in such a way that an overall resistance between the region that is in contact with the rim during subsequent use on the one hand and the guide strip on the other measures at most 100 MΩ, preferably at most 10 MΩ.

A tread manufacturing device according to the invention preferably has a conveying device, which is arranged behind the extruder system in the direction of material flow so as to convey the guide strip. It is favorable, but not necessary, that the electrode be comprised of the conveying device.

The tread manufacturing device preferably comprises a marking device for marking a region of the tread where the maximum resistance has been exceeded. For example, the marking device can be designed to mark the region with color. For example, the color is sprayed or brushed on.

Alternatively or additionally, the tread manufacturing device preferably has a cutting device for cutting the tread into tread sections, which is designed to cut out the marked region. This ensures that only those regions of the guide strip in which the maximum resistance has not been exceeded are used for manufacturing tires.

BRIEF DESCRIPTION OF THE DRAWINGS

The invention will be explained in more detail below based on the attached drawings. Shown here on.

DESCRIPTION OF EXAMPLE EMBODIMENTS

Figures 1, 2, 3:
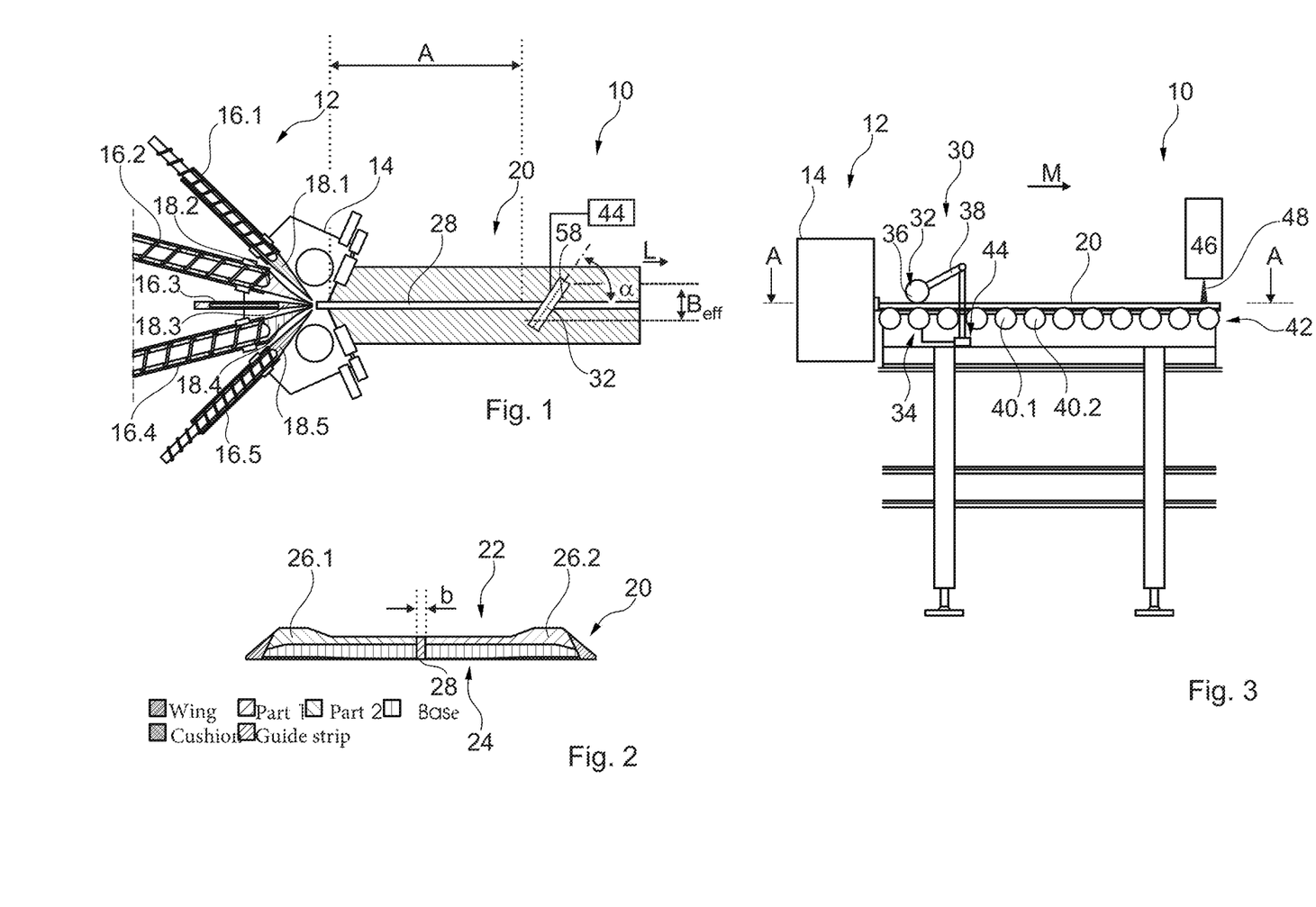
FIG. 1 is a horizontal view of a tread manufacturing device according to the invention.
FIG. 2 is a cross section through a guide strip fabricated by means of the tread manufacturing device.
FIG. 3 is a side view of the tread manufacturing device according to FIG. 1.

FIG. 1 shows a tread manufacturing device 10 according to the invention, which comprises an extruder system 12. The extruder system 12 has a head 14 and, in the present case, five extruders 16.1, ..., 16.5. The extruders 16.$i$ ($i$=1, 2, 3, 4, 5) each convey rubber material, and press it into the head 14 through corresponding guide channels 18.$i$. The head 14 forms a tread 20 out of the rubber material.

FIG. 2 shows a cross section through the tread 20. As evident, the latter has an exterior side 22 and an interior side 24. In a tire produced by means of the tread 20, the interior side 24 faces inward, and the exterior side 22 faces toward the street.

The tread 20 has a carrying region 26, which in the present case is composed of carrying region parts 26.1, 26.2. Carrying region rubber material is present in the carrying region. In addition to rubber and possibly soot and other constituents, the carrying region rubber material consists of a high percentage of silicon dioxide. For example, the percentage of silicon dioxide measures at least 10 percent by weight and at most 20 percent by weight. As a result, the carrying region 26 has a high resistance to wear. However, the specific electrical resistance is high, and measures more than $\rho_{26}=10^{12}$ Ω·m, for example. This value relates to 20° C.

The tread 20 also has a guide strip 28 comprised of guide strip rubber material, the electrical conductivity $\rho_{28}$ of which is distinctly lower, and in particular measures at most ⅒ of the electrical conductivity $\rho_{26}$ of the carrying region rubber material. An electrical resistance $\rho_{28}$ of the guide strip between the exterior side 22 and interior side 24 preferably measures at most $W_{28}$=100 MΩ, in particular at most $W_{28}$=10 MΩ.

FIG. 3 presents a schematic, side view of the tread manufacturing device 10. As evident, the tread manufacturing device 10 has a resistance determining device 30, which has an outer electrode 32 and an inner electrode 34. The outer electrode 32 comprises a wheel 36, which is fastened in an electrically conductive manner to an arm 38. The inner electrode 34 is formed by at least one support roller 40.1 of a conveying device 42. The conveying device 42 transports the tread 20 away from the head 14 (see FIG. 1). An evaluation circuit 44 determines the electrical resistance $W_{28}$ between the outer electrode 32 and inner electrode 34, which very closely approximates the resistance of the guide strip 28 (see FIG. 2).

In terms of a direction of material flow M, electrodes 32, 34 are arranged closely behind the head 14. If the evaluation circuit 44 detects an electrical resistance $W_{28}$ greater than a prescribed maximum resistance $W_{28,max.}$, it emits a warning signal.

For example, the warning signal can be an electrical signal to a control unit, which also controls the extruder system 12. Alternatively involved is an acoustic and/or optical signal, so that a machine operator can recognize the error. Alternatively or additionally as well, the evaluation circuit 44 is wirelessly connected or hardwired with a schematically recorded marking device 46, which in this case applies color 48 to the tread 20, in particular through spraying. The section of the tread that can possibly not be used for manufacturing tires is marked in this way.

Figure 4:
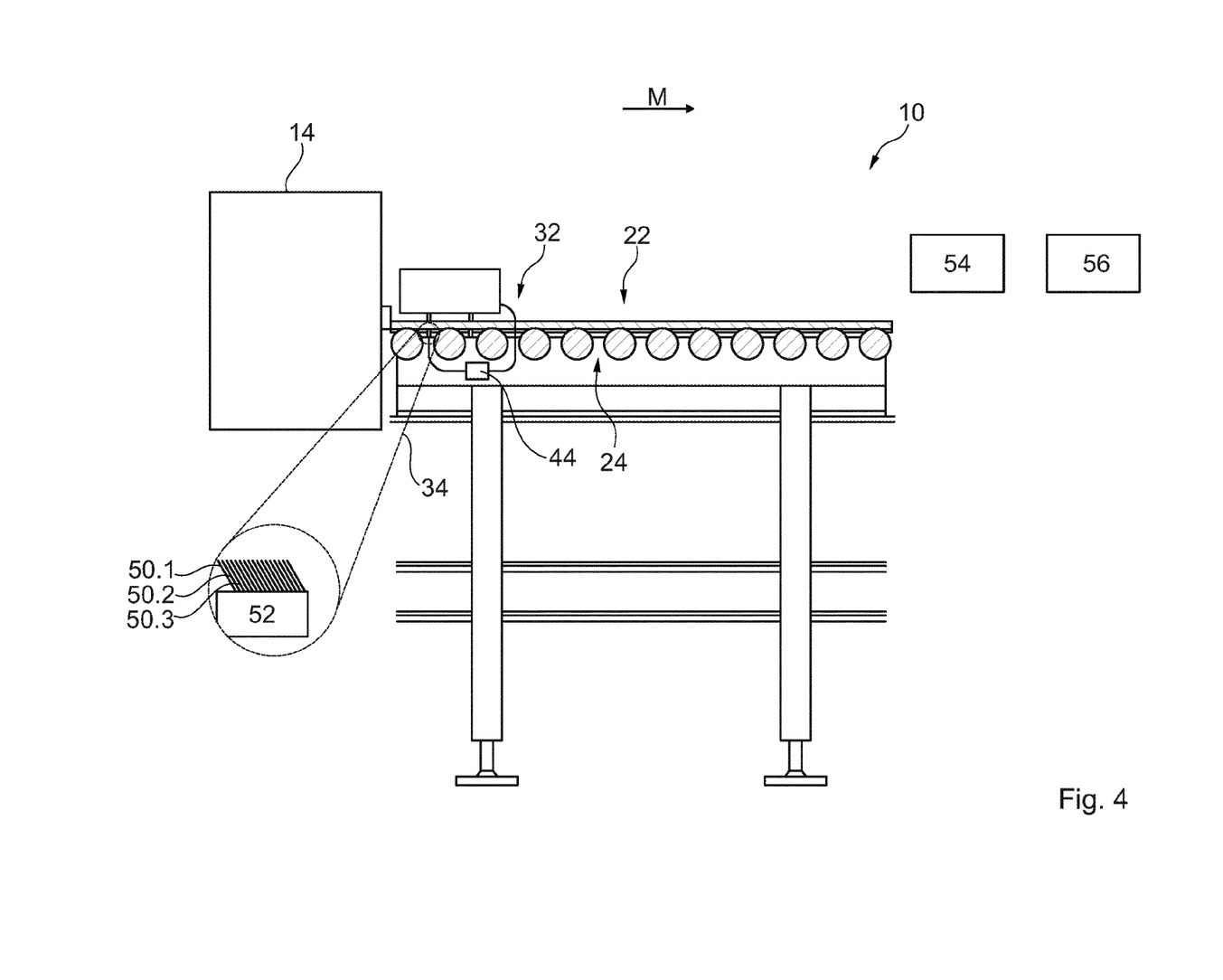
FIG. 4 is a schematic, side view of a tread manufacturing device based on a second embodiment.

FIG. 4 shows a schematic, side view of a tread manufacturing device 10 according to a second embodiment of the invention. As evident, both the outer electrode 32 and inner electrode 34 have a plurality of hair-shaped conductors 50.1, 50.2, . . . , which are combined into a block 50 and thereby electrically contacted. The conductors 50.$j$ ($j$=1, 2, . . . ) pass by the guide strip 28 from the exterior side 22 and interior side 24, and thereby contact it. The evaluation takes place as described above.

Purely schematically delineated are a cutting machine and a vulcanizing device 56, which are used to manufacture tires using the tread 20.

Figure 5:
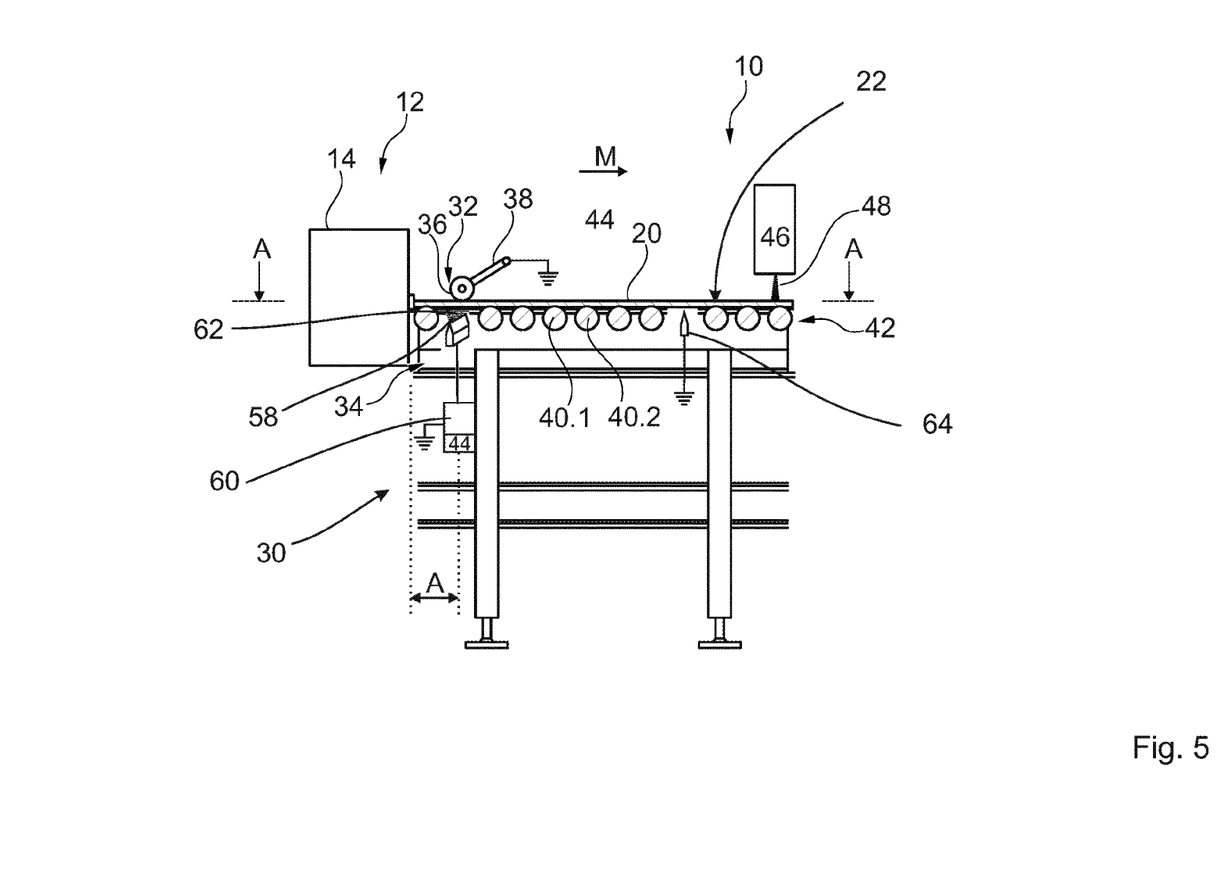
FIG. 5 shows a horizontal section of a tread manufacturing device based on a second embodiment of the invention.

FIG. 5 shows another tread manufacturing device 10 according to the invention, in which an electrode, in the case at hand the outer electrode 32, is arranged for grounding the tread 20, and in particular the guide strip 28.

Let it be noted that the orientation of the tread 20 can also be reversed in the entire specification. In other words, the structure of the tread manufacturing device does not change if the tread lies on the conveying device 42 not with its exterior side 22 facing up, but rather with its exterior side 22 facing down. The outer electrode 32 could therefore also be referred to as the first electrode, and the inner electrode 34 could also be referred to as the second electrode. The terms outer electrode and inner electrode are only used for the sake of simplicity.

The tread manufacturing device 10 has an inner electrode 34, which is designed for contacting the tread 20 without contact. The inner electrode 34 has an emission edge 58, and is connected with a high-voltage source 60. In the present case, the high-voltage source emits a voltage U, which can also be referred to as the application voltage, that measures U=3 kV. Therefore, electrons 62 are applied from the emission edge 58 onto the tread 20.

If the guide strip 28 (see FIG. 2) is correctly designed, its electrical resistance $W_{28}$ is less than the prescribed maximum resistance $W_{28,max}$. As a result, an electrical current I arises between the inner electrode 34 and outer electrode 32. In the present case, the outer electrode 32 is grounded, and the high-voltage source 60 generates a voltage against ground. Alternatively, the outer electrode can be directly connected with the high-voltage source 60.

The electrical current I is detected by the evaluation circuit, which is connected with the high-voltage source 60. The high-voltage source 60 can also be part of the evaluation circuit 44. The higher the electrical current E, the lower the electrical resistance $W_{28}$ of the guide strip 28.

If the guide strip 28 is defective, i.e., if it has too high an electrical resistance, the electrons 62 permanently accumulate on the tread 20. They there form a permanently remaining electrical charge Q. This charge Q leads to an electrical field that superposes itself with the electrical field of the inner electrode, and causes the current I to become smaller. Therefore, the current I is a parameter P based upon which the guide strip resistance can be assessed. If the parameter P, for which P=I in the case at hand, drops below a minimum value $I_{min}$, it indicates that the guide strip resistance $W_{28}$ has dropped below the prescribed maximum value $W_{28,max}$. A warning signal is then output.

A discharge electrode 64 is arranged behind the electrodes 32, 34 in the direction of material flow M, and used to largely discharge the tread 20. It is possible and preferred that the discharge electrode work without contact, as in the present case. However, the discharge electrode 64 can also work in a contacting manner.

Figure 6:
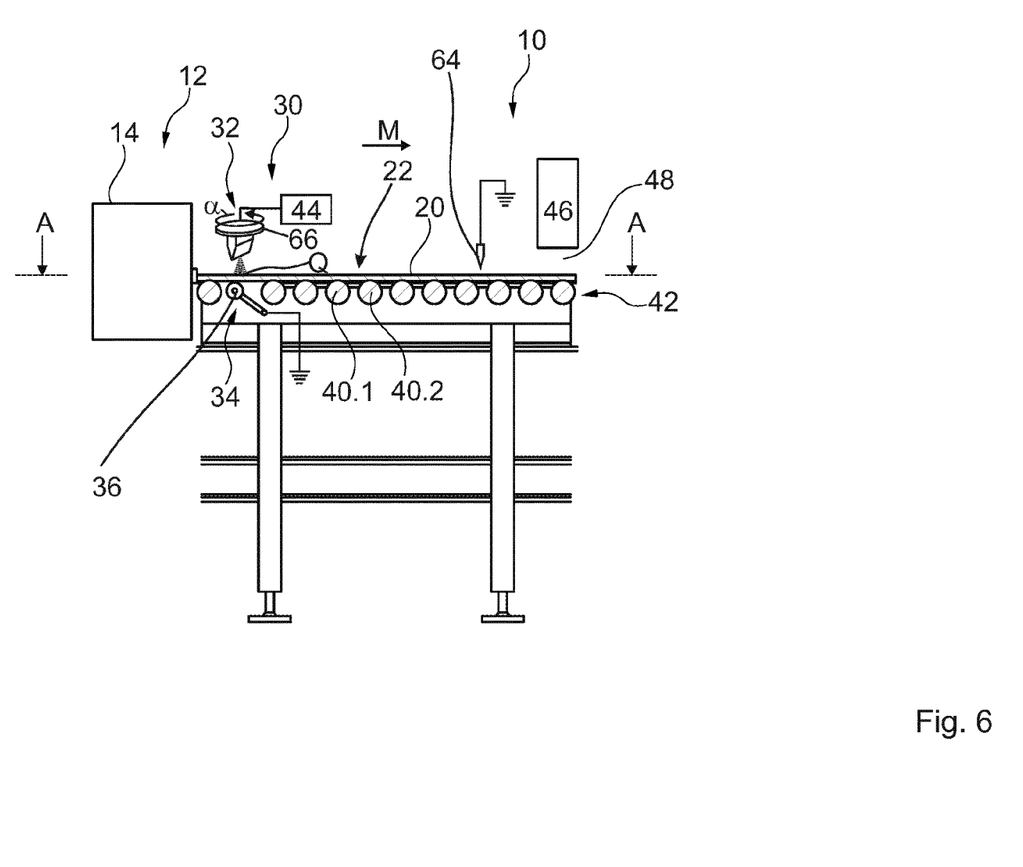
FIG. 6 shows a horizontal section of a tread manufacturing device according to the invention based on a third embodiment of the invention.

FIG. 6 shows another alternative embodiment of a tread manufacturing device 10 according to the invention, in which the outer electrode is designed as a contactless electrode. The latter applies the electrical charge Q to the exterior side 22 of the tread 20. The tread is grounded by means of the inner electrode 34, which in the present case has a wheel 36 as described above, which contacts the guide strip 28 (see FIG. 2).

FIG. 1 presents a schematic, top view of the outer electrode 32. As evident, the emission edge 58 extends transverse to a longitudinal direction L of the tread 20. In other words, an offset angle $\alpha$ in the case at hand preferably measures at least 75°, and at most 105°.

The electrode can be turned with a turning device 66 (see FIG. 6) in such a way that the offset angle $\alpha$ can be adjusted. This makes it possible to adjust the offset angle $\alpha$, and hence an effective width $B_{eff}$ of the outer electrode 32. It is favorable that the effective width $B_{eff}$ be greater than the width b of the guide strip 28. However, it is also favorable that the effective width $B_{eff}$ be at least three times, preferably at least five times, the width b of the guide strip 28. As a rule, it is favorable that the effective width $B_{eff}$ measure at most 50 times, in particular 30 times, the width b of the guide strip.

The evaluation circuit 44 continuously compares whether the parameter P, in the present case the electrical current I, has a value indicating that the guide strip resistance $W_{28}$ does not exceed the prescribed maximum value $W_{28,max}$. If the parameter P is the electrical charging current I, a drop below a minimum current $I_{min}$ means that the guide strip resistance $W_{28}$ has exceeded the prescribed maximum value $W_{28,max}$. For example, the electrical current I is determined at least once per second, preferably at least once per tenth of a second.

As described above, the charge Q can be applied in the form of electrons. Alternatively, it is also possible that the respective electrode be designed as an anti-static bar, which accelerates ions toward the tread 20, and thereby electrostatically charges the latter.

REFERENCE LIST

10 Tread manufacturing device
12 Extruder system
14 Head
16 Extruder
20 Tread
22 Exterior side
24 Interior side
26 Carrying region
28 Guide strip
30 Resistance determining device
32 Outer electrode
35 Inner electrode
36 Wheel
38 Arm
40 Support roller
42 Conveying device
44 Evaluation circuit
46 Marking device
48 Color
50 Conductor
52 Block
54 Cutting device
56 Vulcanizing device
58 Emission edge
60 High-voltage source
62 Electrons 64 Discharge electrode
66 Turning device
A Distance between extruder outlet and electrode
α Offset angle
B Width of guide strip
I Load index
I Electrical current
$I_{min}$ Minimal current
M Direction of material flow
P Parameter
Q Electrostatic charge
U Voltage (=applied voltage)
$W_{28}$ Electrical resistance of tread
$W_{28,max}$ Maximum resistance
ρ Specific electrical resistance

What is claimed is:

1. A method for manufacturing a tread (20), with the steps of:
   (a) extruding a tread (20), which
      has an exterior side (22) and an interior side (24) lying opposite the exterior side (22), and
      comprises a supporting area (26) made out of a rubber supporting area material
      and a guide strip (28) made out of a rubber guide strip material,
   (b) wherein the guide strip (28) extends from the exterior side (22) to the interior side (24), and a specific electrical guide strip resistance ($ρ_{28}$) of the guide strip rubber material is less than a specific electrical supporting area resistance ($ρ_{26}$) of the supporting area rubber material,
   characterized by the steps of:
   (c) determining a parameter (P) that correlates with an electrical guide strip resistance ($W_{28}$) of the guide strip (28) between the exterior side (22) and interior side (24), and
   (d) outputting a warning signal when the parameter (P) assumes a value indicating that the guide strip resistance ($W_{28}$) exceeds a prescribed maximum value ($W_{28,max}$),
   wherein
   (a) determining the parameter (P) involves the step of applying an electrostatic charge (Q) to a side (22, 24), and
   (b) the parameter (P) describes a charging current (I) that arises when applying an electrostatic charge (Q), and
   wherein
   the electrostatic charge (Q) is applied without contact.

2. The method according to claim 1, wherein determining the guide strip resistance ($W_{28}$) involves the following steps:
   contacting the exterior side (22) by means of an outer electrode (32), and
   contacting the interior side (24) with an inner electrode (34),
   wherein one of the electrodes (22, 24) contacts the tread (20) from above.

3. The method according to claim 1, wherein
   a region of the tread (20) in which the maximum resistance ($W_{28,max}$) has been exceeded is eliminated.

4. A method for manufacturing a tread (20), with the steps of:
   (a) extruding a tread (20), which
      has an exterior side (22) and an interior side (24) lying opposite the exterior side (22), and
      comprises a supporting area (26) made out of a rubber supporting area material
      and a guide strip (28) made out of a rubber guide strip material,
   (b) wherein the guide strip (28) extends from the exterior side (22) to the interior side (24), and a specific electrical guide strip resistance ($ρ_{28}$) of the guide strip rubber material is less than a specific electrical supporting area resistance ($ρ_{26}$) of the supporting area rubber material,
   characterized by the steps of:
   (c) determining a parameter (P) that correlates with an electrical guide strip resistance ($W_{28}$) of the guide strip (28) between the exterior side (22) and interior side (24), and
   (d) outputting a warning signal when the parameter (P) assumes a value indicating that the guide strip resistance ($W_{28}$) exceeds a prescribed maximum value ($W_{28,max}$),
   wherein
   (a) determining the parameter (P) involves the step of applying an electrostatic charge (Q) to a side (22, 24), and
   (b) the parameter (P) describes a charging current (I) that arises when applying an electrostatic charge (Q), and
   wherein a voltage (U) measures at least 3 kV when applying the charge.

5. A method for manufacturing a tread (20), with the steps of:
   (a) extruding a tread (20), which
      has an exterior side (22) and an interior side (24) lying opposite the exterior side (22), and
      comprises a supporting area (26) made out of a rubber supporting area material
      and a guide strip (28) made out of a rubber guide strip material,
   (b) wherein the guide strip (28) extends from the exterior side (22) to the interior side (24), and a specific electrical guide strip resistance (p28) of the guide strip rubber material is less than a specific electrical supporting area resistance (p26) of the supporting area rubber material,
   characterized by the steps of:
   (c) determining a parameter (P) that correlates with an electrical guide strip resistance ($W_{28}$) of the guide strip (28) between the exterior side (22) and interior side (24), and
   (d) outputting a warning signal when the parameter (P) assumes a value indicating that the guide strip resistance ($W_{28}$) exceeds a prescribed maximum value ($W_{28,max}$),
   wherein
   (a) determining the parameter (P) involves the step of applying an electrostatic charge (Q) to a side (22, 24), and
   (b) the parameter (P) describes a charging current (I) that arises when applying an electrostatic charge (Q), and
   wherein
   the electrode (32, 43) used in applying the charge has an emission edge (58), and that
   the electrode (32, 34) can be turned in such a way that an effective width ($B_{eff}$) of the electrode (32, 34) can be varied.

* * * * *